US012645239B2

(12) United States Patent
Englekirk

(10) Patent No.: US 12,645,239 B2
(45) Date of Patent: *Jun. 2, 2026

(54) LEAKAGE COMPENSATION CIRCUIT

(71) Applicant: pSemi Corporation, San Diego, CA (US)

(72) Inventor: Robert Mark Englekirk, Littleton, CO (US)

(73) Assignee: PSEMI CORPORATION, San Diego, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 18/427,594

(22) Filed: Jan. 30, 2024

(65) Prior Publication Data

US 2024/0272664 A1 Aug. 15, 2024

Related U.S. Application Data

(63) Continuation of application No. PCT/US2022/038727, filed on Jul. 28, 2022, which is (Continued)

(51) Int. Cl.
*G05F 1/56* (2006.01)
*G05F 1/565* (2006.01)
*G05F 3/26* (2006.01)

(52) U.S. Cl.
CPC .............. *G05F 1/565* (2013.01); *G05F 3/262* (2013.01)

(58) Field of Classification Search
CPC ................................. G05F 1/565; G05F 3/262
See application file for complete search history.

(56) References Cited

U.S. PATENT DOCUMENTS 7,944,277 B1 5/2011 Sinitsky et al.
7,965,067 B2 6/2011 Groenthal et al.
(Continued)

FOREIGN PATENT DOCUMENTS

CN 1821922 A 8/2006
EP 3709123 A1 * 9/2020 ............ G05F 1/575
(Continued)

OTHER PUBLICATIONS

Korean Intellectual Property Office, International Search Report and Written Opinion received from KIPO dated Nov. 18, 2022 for appln. No. PCT/US2022/038727, 10 pgs.
(Continued)

*Primary Examiner* — Lakaisha Jackson
(74) *Attorney, Agent, or Firm* — Steinfl + Bruno LLP

(57) ABSTRACT

Circuits and methods that compensate for the problems created by low-dropout regulator (LDO) leakage current, particularly when stressed. Embodiments include an improved LDO configured to provide a load current, and which includes a leakage current compensation circuit. The leakage current compensation circuit generates a compensating current that offsets the leakage current through the pass device of the LDO during conditions that induce such leakage. More specifically, the leakage current compensation circuit can replicate the leakage current of the pass device of the LDO and feed a compensating current back into the LDO from a current mirror circuit while drawing zero-power during normal use, when leakage current is absent. LDO circuits that include a leakage current compensation circuit are particularly useful as voltage sources for positive or negative charge pumps, but are also quite useful in applications requiring a regulated voltage output.

20 Claims, 6 Drawing Sheets

Related U.S. Application Data a continuation of application No. 17/396,508, filed on Aug. 6, 2021, now Pat. No. 11,614,759.

(56) References Cited

U.S. PATENT DOCUMENTS

| | | | | |
|---|---|---|---|---|
| 8,169,203 | B1 * | 5/2012 | Vemula | G05F 1/575 323/273 |
| 9,436,197 | B1 * | 9/2016 | Tang | G05F 1/565 |
| 9,488,996 | B2 | 11/2016 | Bossu et al. | |
| 9,685,963 | B2 | 6/2017 | Englekirk | |
| 11,614,759 | B2 | 3/2023 | Englekirk | |
| 11,641,159 | B1 | 5/2023 | Englekirk | |
| 11,728,719 | B2 | 8/2023 | Takobe | |
| 2003/0111986 | A1 | 6/2003 | Xi | |
| 2004/0239304 | A1 | 12/2004 | Perez | |
| 2008/0203983 | A1 * | 8/2008 | Lo Lacono | G05F 1/565 323/266 |
| 2010/0156518 | A1 | 6/2010 | Hoque et al. | |
| 2013/0063103 | A1 | 3/2013 | Samid | |
| 2013/0148456 | A1 | 6/2013 | Cho et al. | |
| 2013/0285631 | A1 * | 10/2013 | Bisson | G05F 1/575 323/280 |
| 2015/0177754 | A1 | 6/2015 | Mengad et al. | |
| 2016/0048148 | A1 * | 2/2016 | Lee | G05F 1/575 323/280 |
| 2016/0134967 | A1 | 5/2016 | Kwon | |
| 2019/0041885 | A1 | 2/2019 | Hu | |
| 2019/0050013 | A1 | 2/2019 | Wu | |
| 2019/0258282 | A1 | 8/2019 | Magod Ramakrishna et al. | |
| 2020/0285260 | A1 | 9/2020 | Londak et al. | |
| 2022/0140791 | A1 | 5/2022 | Vangara | |
| 2022/0171417 | A1 | 6/2022 | Fiocchi | |
| 2023/0037837 | A1 | 2/2023 | Englekirk | |
| 2023/0155489 | A1 | 5/2023 | Englekirk | |

FOREIGN PATENT DOCUMENTS

| | | | |
|---|---|---|---|
| KR | 101603776 | B1 | 3/2016 |
| WO | 2020/209369 | A1 | 10/2020 |

OTHER PUBLICATIONS

Jackson, Lakaisha, Notice of Allowance received from the USPTO dated Dec. 27, 2022 for U.S. Appl. No. 17/396,508, 9 pgs.

International Search Report and Written Opinion issued for International Application No. PCT/US2022/079558 filed on Nov. 8, 2022 on behalf of pSemi Corporation. Mail Date: Mar. 13, 2023. 10 pages.

Non-Final Office Action issued for U.S. Appl. No. 18/658,746 filed on behalf of pSemi Corporation. Mail Date: Oct. 17, 2025. 16 pages.

* cited by examiner

LEAKAGE COMPENSATION CIRCUIT

CROSS-REFERENCE TO RELATED APPLICATIONS

The present application is a continuation of PCT Patent Application No. PCT/US2022/038727, filed on Jul. 28, 2022 and titled “Wideband Amplifier Tuning” which is herein incorporated by reference in its entirety and which, in turn, claims priority to U.S. patent application Ser. No. 17/396,508, filed on Aug. 6, 2021, for “LEAKAGE COMPENSATION CIRCUIT,” now U.S. Pat. No. 11,614,759, issued Mar. 28, 2023, the content of which is incorporated herein by reference in its entirety.

BACKGROUND

(1) Technical Field

This invention relates to electronic circuitry, and more particularly to leakage compensation circuits.

(2) Background

FIG. 1 is a block diagram and partial schematic of a prior art low-dropout regulator (LDO) 102 configured to generate a regulated output voltage which can source current to a load 104. As is known in the art, an LDO is a DC linear voltage regulator that can regulate its output voltage $V_{OUT}$ even when its supply voltage $V_{DD}$ is very close to the output voltage.

In the illustrated example, the LDO 102 includes a pass transistor M (shown as a P-type MOSFET) configured to generate a regulated output voltage $V_{OUT}$ from an input voltage $V_{DD}$. The pass device M has a gate controlled by an error amplifier 106 which compares a reference voltage $V_{REF}$ to the output of a feedback network 108 coupled to a $V_{OUT}$ output node. The feedback network 108 may be, for example, a resistive divider network that provides a scaled version of $V_{OUT}$ to one input of the error amplifier 106.

In the illustrated example, the load 104 includes a charge pump 104*a* which may be configured for different applications to output a positive or negative voltage that is a multiple (including negative one) of its input voltage. The charge pump 104*a* is coupled in this example to a level shifter 104*b*, which translates an input signal from one voltage range to another voltage range in known fashion. Continuing this example, the translated output of the level shifter 104*b* is coupled to the gate of an RF FET 104*c* (which may be a MOSFET) configured as a switch to block or conduct an RF signal. As should be clear, the load 104 may comprise other and/or different circuitry that benefits from the regulated voltage output of an LDO 102.

There are circumstances in which the LDO's (102) $V_{DD}$ is increased (e.g., during testing beyond a normal operational range) to the point that the pass device M of the LDO 102 generates a substantial leakage current from source to drain than it otherwise would have in normal operation. While the illustrated LDO 102 with pass device M can source current to its output, it cannot sink current from its output. Any substantial leakage current through pass device M that cannot be controlled by varying the gate voltage of the pass device, may prevent the LDO from regulating its output, especially if the load 104 requires a load current less than the leakage current. Further, if the load current requirement is sufficiently low, the leakage current will not be dissipated into the load and $V_{OUT}$ pass device will drift towards $V_{DD}$. For some voltage sensitive loads 104, the extra voltage at the $V_{OUT}$ output node during such a condition may exceed the reliability limits of the devices. Further, if $V_{OUT}$ from the LDO 102 is applied to the input of a charge pump 104*a* under such conditions, the problem may be literally multiplied as the charge pump output responds to that increased input voltage and outputs a voltage that exceeds a target voltage, again potentially exceeding the reliability limits of devices coupled to the charge pump 104*a*, such as the level shifter 104*b*. For example, if $V_{DD}$ is 1.8V and the regulated output $V_{OUT}$ of the LDO 102 is supposed to be 1.5V, then during conditions that cause the pass device M to leak, $V_{OUT}$ may drift up towards 1.8V during an increased stress event or low-load event. As a worst case if the output voltage drifts to 1.8V, and this 1.8V is applied to a 3× charge pump 104*a* designed to output 4.5V from a 1.5V input, the charge pump 104*a* will instead output 5.4V, which may cause over-voltage stress and compromise the reliability of devices and components in the load 104.

Accordingly, there is a need for an LDO that includes some way of compensating for the problems created by LDO current leakage. The present invention addresses this need.

SUMMARY

The present invention encompasses circuits and methods that compensate for the problems created by low-dropout regulator (LDO) leakage current, particularly when the source-to-drain voltage of the LDO's pass device is increased (e.g., during testing beyond a normal operational range). The present invention also encompasses circuits and methods that provide a leakage current compensation circuit that may be applied to other circuits that exhibit source-to-drain leakage current.

Embodiments include an improved LDO configured to provide a load current, and which includes a leakage current compensation circuit. The function of the leakage current compensation circuit is to generate a current that counteracts the leakage current through the pass device of the LDO during conditions that induce such leakage. More specifically, the leakage current compensation circuit can replicate the leakage current of the pass device of the LDO and feed a compensating current to the LDO's output from a current mirror circuit while drawing almost no power during normal use, when leakage current is negligible.

The leakage current compensation circuit is particularly beneficial when used in conjunction with an LDO based on a short channel FET device, but works as well with an LDO based on a long channel FET device.

LDO circuits that include a leakage current compensation circuit are particularly useful as voltage sources for positive or negative charge pumps, but are also quite useful in applications requiring a regulated voltage output where the current loading may be both very high at times and very low at other times.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods that compensate for the problems created by low-dropout regulator (LDO) leakage current, particularly when the source-to-drain voltage of the LDO's pass device is increased (e.g., during testing beyond a normal operational range). The present invention also encompasses circuits and methods that provide a leakage current compensation circuit that may be applied to other circuits that exhibit source-to-drain leakage current.

Figure 1:
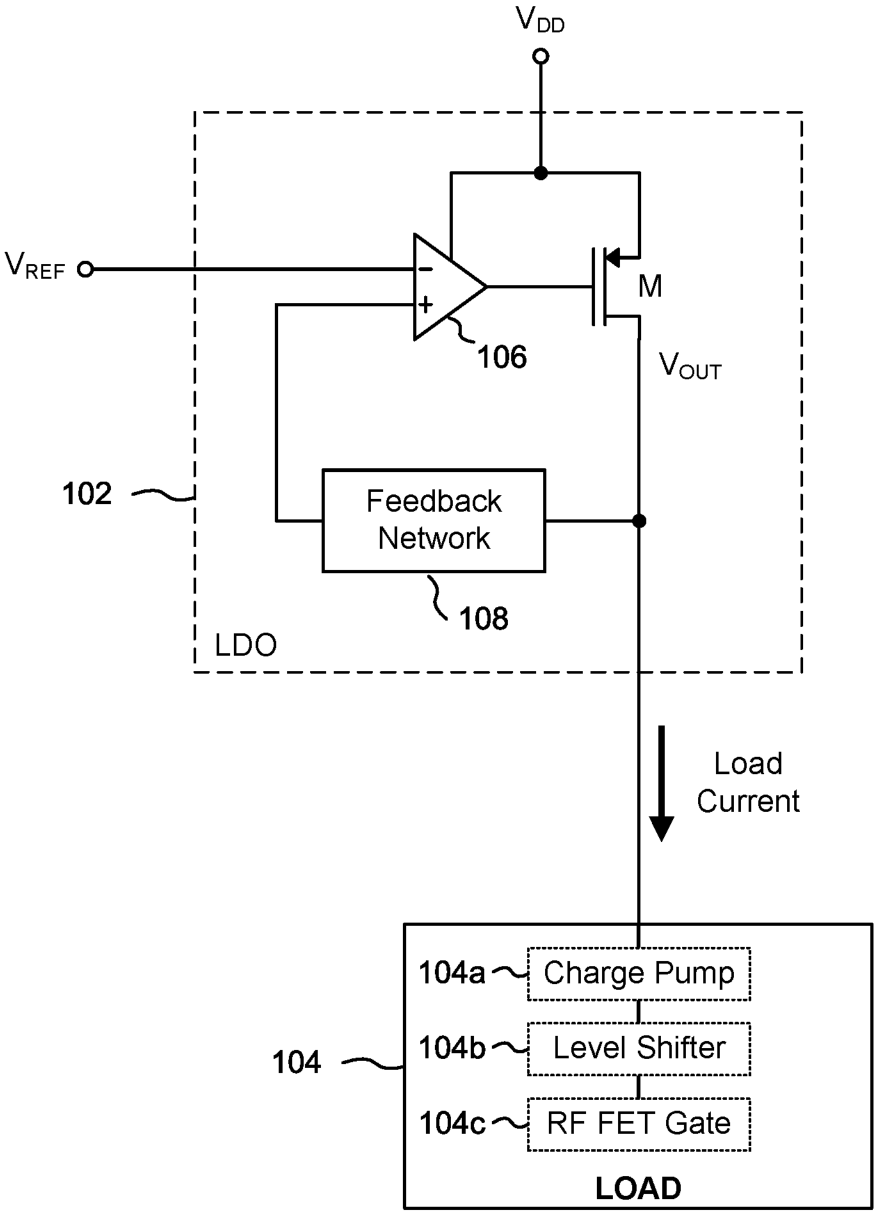
FIG. 1 (Prior Art)
FIG. 1 is a block diagram and partial schematic of a prior art low-dropout regulator (LDO) configured to generate a regulated output voltage which can source current to a load.
Figure 2:
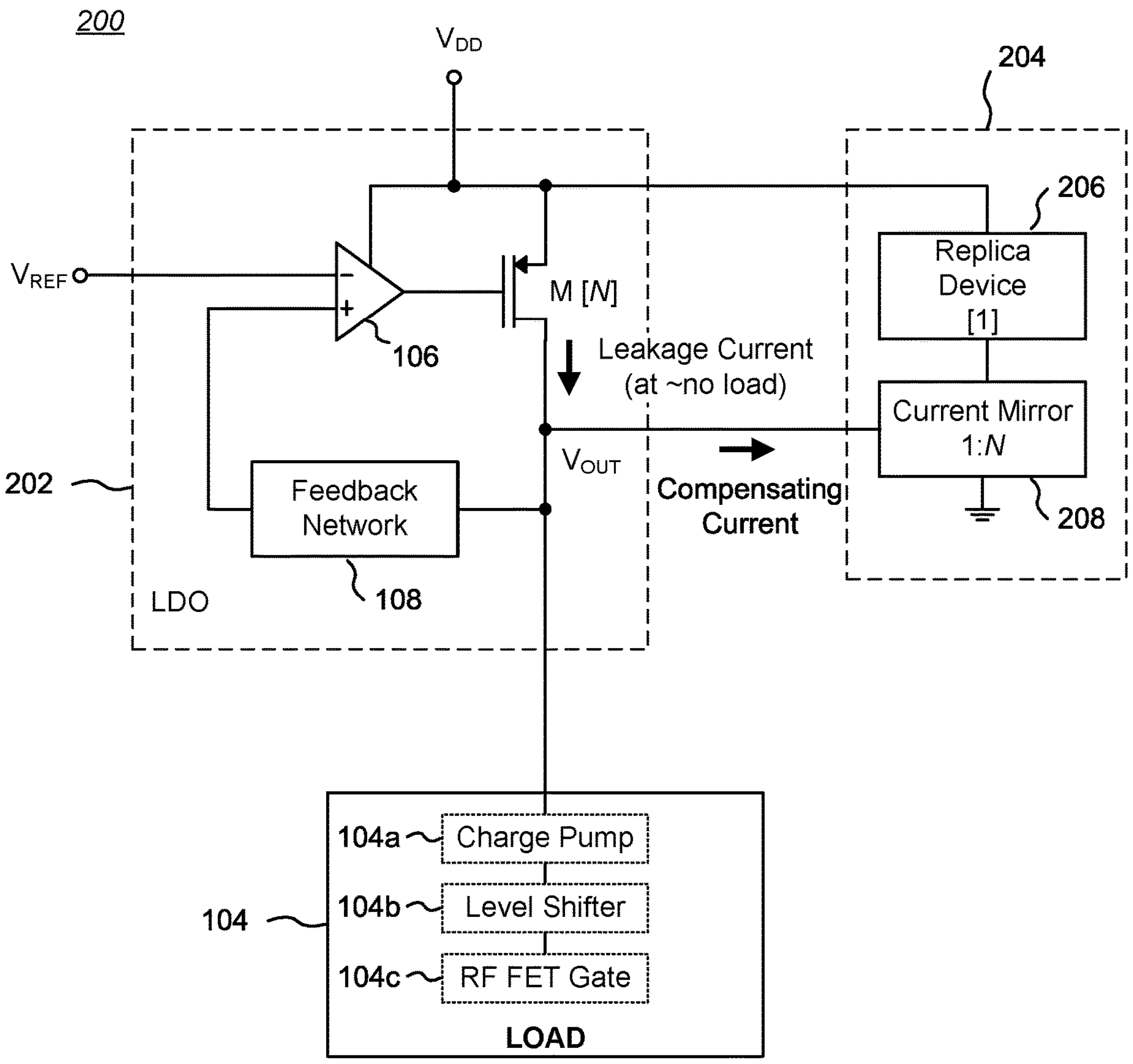
FIG. 2 is a block diagram and partial schematic of an improved low-dropout regulator (LDO) configured to provide a load current to a load and including a leakage current compensation circuit coupled to the pass device of the LDO.

FIG. 2 is a block diagram and partial schematic 200 of an improved low-dropout regulator (LDO) 202 configured to provide a load current to a load 104 and including a leakage current compensation circuit 204 coupled to the pass device M of the LDO. The function of the leakage current compensation circuit 204 is to generate a current that counteracts the leakage current through the pass device M of the LDO 202 during conditions (such as stress testing or circuit bias conditions) that induce such leakage by increasing the drain-source voltage, $V_{DS}$, of the pass device M. More specifically, the leakage current compensation circuit 204 can replicate the leakage current of the pass device M of the LDO 202 and feed a compensating current to the LDO's output from a current mirror circuit while drawing almost no power during normal use, when leakage current is negligible.

For example, an LDO pass device M comprising a P-type MOSFET may exhibit excessive leakage current when taken to extremes of process, voltage, and/or temperature (PVT) conditions. For instance, for some electronic products, in order to ensure high reliability of the end product as a whole, component circuitry may be required to be intentionally stressed beyond a normal operational range (e.g., 20% over the maximum specified $V_{DD}$ value, temperatures up to about 125° C., and process corners resulting in low absolute values for the threshold voltage $V_T$ of a FET, thus producing devices having larger than normal leakage current). Further, in some integrated circuit (IC) embodiments, substrate embodiments may be biased in a manner that further reduces the absolute value of a FET's $V_T$, again resulting in increased leakage current of the FET.

For loads that draw high current, such as during FET switching events or for static current loading, an LDO 202 needs to be designed and sized properly, especially the pass device M, to handle the load current requirements. A short channel pass device M can accommodate this load current requirement, but such devices have larger leakage between source and drain than long channel devices during conditions that induce such leakage. On the other hand, while long channel devices leak less during conditions that induce leakage current, they consume significantly more IC die area. For example, a long channel FET device having a width/length ratio of 100/1 (μm/μm) might exhibit less leakage current when stressed than a short channel FET device having a width/length ratio of 50/0.5 μm/μm. However, the long channel FET device may be about 4 times larger in IC area than the short channel FET. Thus, it would be desirable if short channel FET devices could be used in an LDO 202 by compensating for leakage current through the pass device M. However, regardless of channel length, it is desirable to compensate for source-drain leakage current not only in LDO's but in other circuits under conditions that induce such leakage current.

The leakage current compensation circuit 204 does just that by providing a circuit which can replicate the leakage current of the pass device M of the LDO 202 and feed a compensating current to the output of the LDO 202 from a current mirror circuit while drawing almost no power during normal use, when leakage current is negligible. The leakage current compensation circuit 204 is particularly beneficial when used in conjunction with an LDO 202 based on a short channel FET device, but works as well with an LDO 202 based on a long channel FET device and in other circuits under conditions that induce source-drain leakage current.

Referring back to FIG. 2, the leakage current compensation circuit 204 includes a replica device 206 that can substantially replicate the electrical characteristics of the pass device M of the LDO 202, and in particular the leakage current characteristics. The replica device 206 is configured to be normally OFF (non-conducting), resulting in only leakage current from source to drain. The replica device 206 need not consume a large amount of IC area, and generally may be a scaled version of the type of device used for the pass device M. For example, the replica device 206 is indicated in FIG. 2 as having a nominal W/L size of one, while the larger pass device M is indicated as having a size of N, where N may be, for example, equal to or greater than one. Accordingly, the ratio of sizes of the pass device M to the replica device 206 is N:1, resulting in the same ratio of leakage current through the pass device M compared to the leakage current through the replica device 206.

The replica device 206 is coupled to a current mirror 208, which in turn is coupled to the $V_{OUT}$ output node of the pass device M. The current mirror 208 is essentially an inverting current amplifier that replicates a scaled copy—and reverses the current direction—of the current passing through the replica device 206. In the illustrated example, the current mirror 208 is configured to have a ratio of input current to scaled output current (i.e., the compensating current) of 1:M. In certain applications, the input-to-output ratio 1:M of the current mirror 208 may be designed to be greater than 1:N in order to provide design margin for various factors, including device variations over process technology corners, and maintaining a desirable operating region for the LDO 202 that allows for optimal regulation and response. In other applications, the input-to-output ratio 1:M of the current mirror 208 may be designed to be less than or equal to 1:N so long as the compensating current through the output MOSFET $M_{N0}$ is equal to or greater than the leakage current of the pass device M minus the load current.

The scaled output current in the current mirror 208 is a reversed-direction compensating current that is coupled to the output (drain) of the pass device M and counteracts the leakage current from the pass device M during conditions which induce such leakage (e.g., during stress testing). Accordingly, when the pass device M is stressed to the point of substantially increasing its leakage current into the drain, so too is the replica device 206 stressed to the point of substantially increasing its leakage current, from which the current mirror 208 generates the compensating current. Conversely, when the pass device M is not stressed—which is generally the case during normal operation while supplying a load current to the load 104—then the pass device M has quite low leakage current and accordingly so does the replica device 206, which is configured to be normally OFF (non-conducting). The replica device 206 and current mirror 208 thus do not draw any substantial power during normal operation, but only during events that induce leakage current in the pass device M of the LDO 202.

In effect, the leakage current compensation circuit 204 behaves like a load that is selectively coupled to the $V_{OUT}$ node of the pass device M only during conditions that cause leakage current in the pass device M. The leakage current compensation circuit 204 otherwise does not affect the normal operational characteristics of the LDO 202. In contrast, an alternative solution using a fixed supplemental load in parallel with the load 104 would constantly draw power even though the fixed supplemental load would be needed only under conditions that cause leakage current in the LDO 202.

Figure 3:
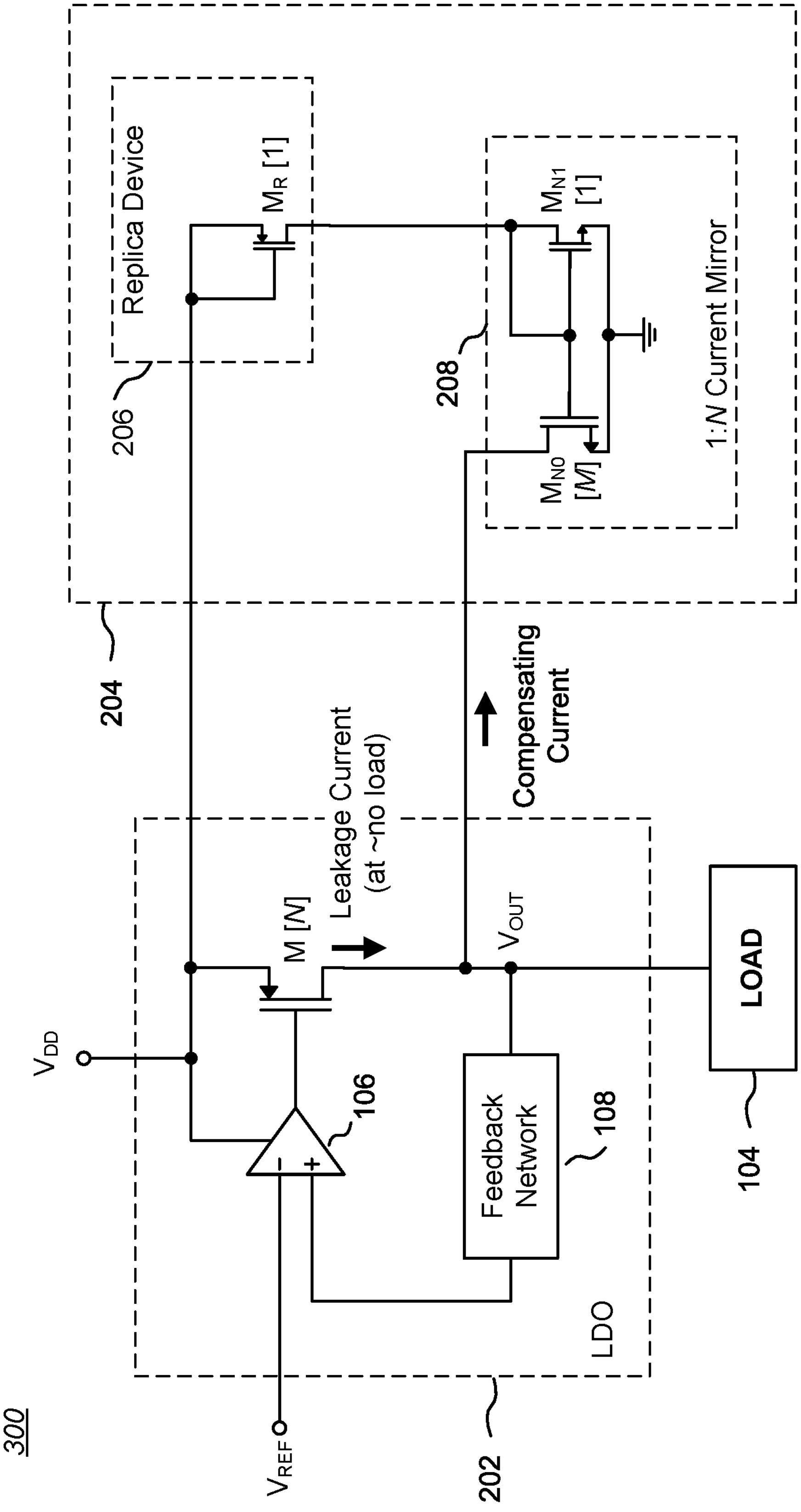
FIG. 3 is a block diagram and partial schematic of the circuit of FIG. 2 showing a detailed embodiment of the leakage current compensation circuit coupled to the pass device of the LDO.

FIG. 3 is a block diagram and partial schematic of the circuit of FIG. 2 showing a detailed embodiment of the leakage current compensation circuit 204 coupled to the pass device M of the LDO 202. In the illustrated example, the replica device 206 is a P-type MOSFET $M_R$ having its gate and source coupled to $V_{DD}$, and its drain coupled to the input of the current mirror 208. Accordingly, the Vas of the MOSFET $M_R$ is zero and under normal conditions MOSFET $M_R$ is OFF (non-conducting). Since the parallel pass device M is also a P-type MOSFET, the co-fabricated P-type MOSFET $M_R$ of the replica device 206 will exhibit the same (but scaled) electrical characteristics as the pass device M.

In some embodiments, the replica device 206 may be designed to operate at a small gate-source voltage to replicate the minimum gate-source voltage that the error amplifier 106 can force on the pass device M (e.g., about 50 mV) to better match the operating condition of the pass device M and the replica device 206.

The current mirror 208 includes an input N-type MOSFET $M_{N1}$ having its drain and gate coupled to the drain of the replica device 206 and its source coupled to a reference potential, such as circuit ground. An output N-type MOSFET $M_{N0}$ has its drain coupled to the $V_{OUT}$ output node of the pass device M, its gate coupled in common with the gate of the input N-type MOSFET $M_{N1}$, and its source coupled to the reference potential.

The input MOSFET $M_{N1}$ is indicated as having a nominal W/L size of one, while the output MOSFET $M_{N0}$ is indicated as having a size of M. Accordingly, as noted above, the current mirror 208 is configured to have a ratio of input current to scaled output current of 1:M, generally at least the reverse of the N:1 ratio of the pass device M to $M_R$. As noted above, in certain applications, the input-to-output ratio 1:M of the current mirror 208 may be designed to be greater than 1:N in order to provide design margin for various factors and maintaining a desirable operating region for the LDO 202 that allows for optimal regulation and response. In other applications, the input-to-output ratio 1:M of the current mirror 208 may be designed to be less than or equal to 1:N. Of note in terms of implementation, the compensating current through the output MOSFET $M_{N0}$ should be equal to or greater than the leakage current of the pass device M minus the load current to prevent voltage drift at the $V_{OUT}$ output node of the LDO 202 as described above, otherwise the problems caused by leakage current through the pass device M will not be resolved. Thus, if the load current is zero, then the compensating current should be equal to or greater than the leakage current of the pass device M.

As one example of operation, the pass device M and MOSFET $M_R$ may be sized such that the pass device M has a leakage current under stress of 10 μA while the MOSFET $M_R$ has a leakage current under stress of 5 μA, a 2:1 ratio. Accordingly, the input MOSFET $M_{N1}$ and the output MOSFET $M_{N0}$ should be sized to have a 1:2 ratio or greater, such that when the input MOSFET $M_{N1}$ is passing 5 μA supplied by MOSFET $M_R$, the output MOSFET $M_{N0}$ is sinking at least 10 μA of current from the output of the LDO 202 to counteract the leakage current from the pass device M.

Figure 4:
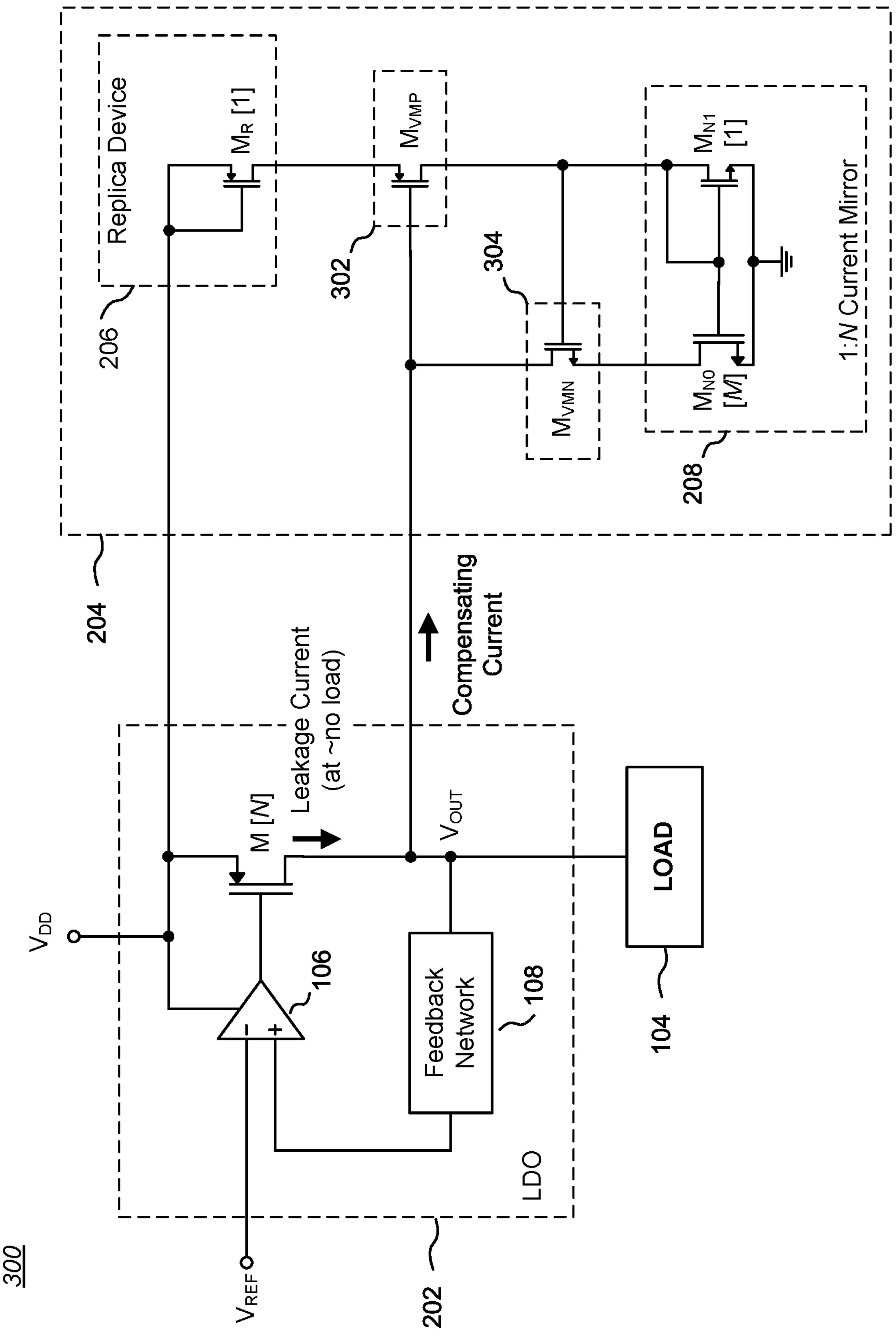
FIG. 4 is a block diagram and partial schematic of the circuit of FIG. 3 showing a variant embodiment of the leakage current compensation circuit coupled to the pass device of the LDO.

FIG. 4 is a block diagram and partial schematic of the circuit of FIG. 3 showing a variant embodiment of the leakage current compensation circuit 204 coupled to the pass device M of the LDO 202. Similar in most respects to FIG. 3, FIG. 4 further includes a first voltage matching circuit 302 and a second voltage matching circuit 304. The purpose of the first and second voltage matching circuits 302, 304 is to better match the drain-source voltage $V_{DS}$ of the respectively coupled devices, MOSFET $M_R$ and the mirror MOSFET $M_{N0}$, with respect to $V_{OUT}$ in order to improve the leakage match of the leakage current compensation circuit 204. In some embodiments, only one of the first or second voltage matching circuits 302, 304 may be included.

In the illustrated example, the first voltage matching circuit 302 comprises a P-type MOSFET $M_{VMP}$ having a gate coupled to the $V_{OUT}$ output node of the pass device M, a source coupled to the drain of the MOSFET $M_R$, and a source coupled to the drain of the input MOSFET $M_{N1}$. The MOSFET $M_{VMP}$ preferably has a threshold voltage $V_T$ of zero. In other embodiments, the voltage matching function of the first voltage matching circuit 302 may be implemented using other circuitry, such as an operational amplifier circuit.

In the illustrated example, the second voltage matching circuit 304 comprises an N-type MOSFET $M_{VMN}$ having a gate coupled to the drain of the input MOSFET $M_{N1}$, a source coupled to the drain of the mirror MOSFET $M_{N0}$, and a drain coupled to the $V_{OUT}$ output node of the pass device M. The MOSFET $M_{VMN}$ preferably has a threshold voltage $V_T$ of zero. In other embodiments, the voltage matching function of the second voltage matching circuit 304 may be implemented using other circuitry, such as an operational amplifier circuit or current mirror enhancement techniques well known in the art.

Note that while FIGS. 3 and 4 show a classic two-FET circuit for the current mirror 208, the current replication and scaling function of the current mirror 208 may be accomplished with other circuits known in the art, such as op-amp circuits or variations of the classic two-FET circuit. Accordingly, the term "current mirror", as used in this disclosure, is not limited to the specific circuitry implementation shown in FIGS. 3 and 4 but encompasses any circuit that replicates and scales an input current.

Circuit Embodiments

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless RF communication.

Figure 5:
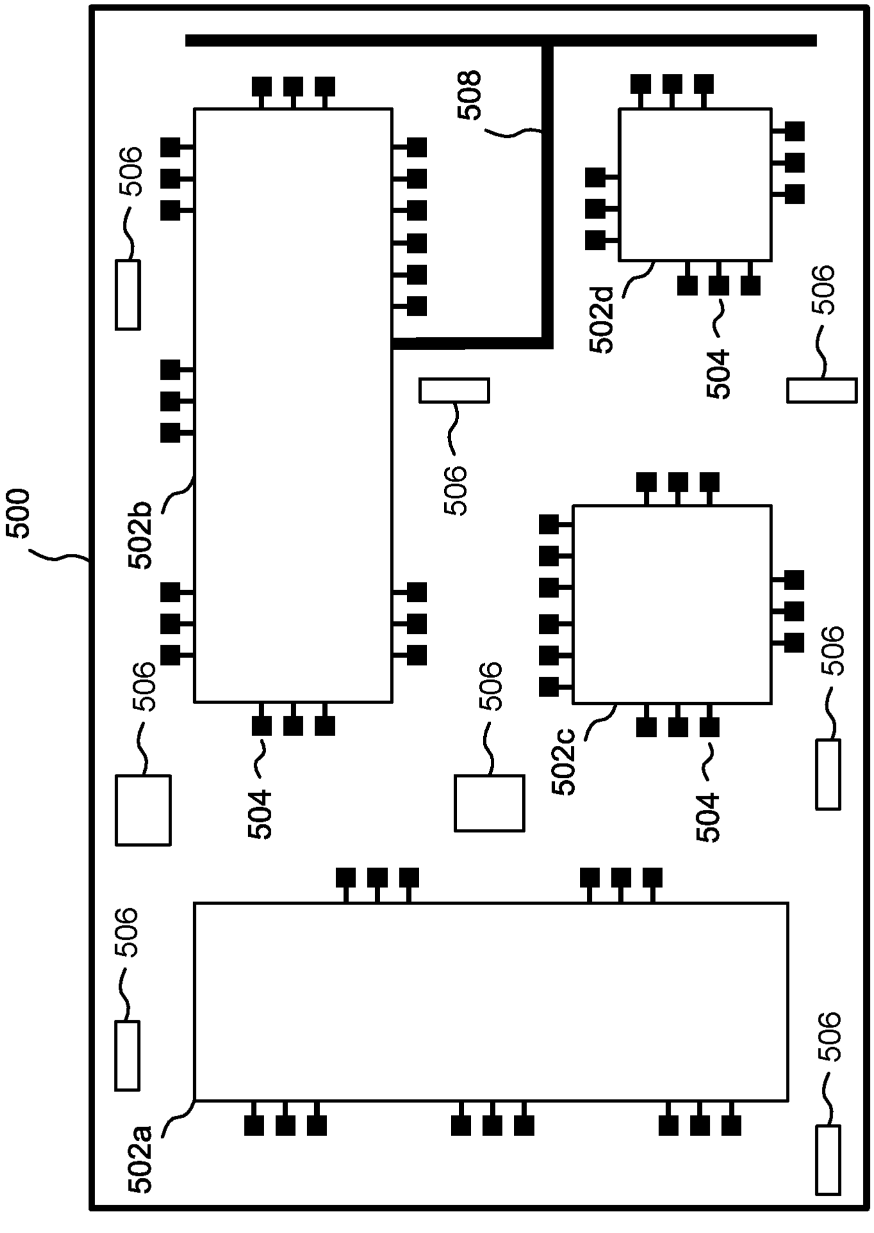
FIG. 5 is a top plan view of a substrate that may be, for example, a printed circuit board or chip module substrate (e.g., a thin-film tile).

As one example of further integration of embodiments of the present invention with other components, FIG. 5 is a top plan view of a substrate 500 that may be, for example, a printed circuit board or chip module substrate (e.g., a thin-film tile). In the illustrated example, the substrate 500 includes multiple ICs 502*a*-502*d* having terminal pads 504 which would be interconnected by conductive vias and/or traces on and/or within the substrate 500 or on the opposite (back) surface of the substrate 500 (to avoid clutter, the surface conductive traces are not shown and not all terminal pads are labelled). The ICs 502*a*-502*d* may embody, for example, signal switches, active filters, amplifiers (including one or more LNAs), and other circuitry. As just one example, IC 502*b* may incorporate one or more instances of an LDO circuit 202 having a leakage current compensation circuit 204 like the circuits shown in FIGS. 3 and 4.

The substrate 500 may also include one or more passive devices 506 embedded in, formed on, and/or affixed to the substrate 500. While shown as generic rectangles, the passive devices 506 may be, for example, filters, capacitors, inductors, transmission lines, resistors, planar antennae elements, transducers (including, for example, MEMS-based transducers, such as accelerometers, gyroscopes, microphones, pressure sensors, etc.), batteries, etc., interconnected by conductive traces on or in the substrate 500 to other passive devices 506 and/or the individual ICs 502*a*-502*d*.

The front or back surface of the substrate 500 may be used as a location for the formation of other structures. For example, one or more antennae may be formed on or affixed to the front or back surface of the substrate 500; one example of a front-surface antenna 508 is shown, coupled to an IC die 502*b*, which may include RF front-end circuitry. Thus, by including one or more antennae on the substrate 500, a complete radio may be created, such as for use in a cell phone.

System Aspects

LDO circuits that include a leakage current compensation circuit are particularly useful as voltage sources for positive or negative charge pumps, but are also quite useful in applications requiring a regulated voltage output where the current loading may be both very high at times and very low at other times. Embodiments of the leakage current compensation circuit of the present invention also may be applied to other circuits that exhibit source-to-drain leakage current.

Embodiments of the present invention are also useful in a wide variety of other circuits and systems for performing a range of functions. Such functions are useful in a variety of applications, such as radar systems (including phased array and automotive radar systems), radio systems (including cellular radio systems), and test equipment. Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, 6G, and WiFi (e.g., 802.11a, b, g, ac, ax, be), as well as other radio communication standards and protocols.

Methods

Figure 6:
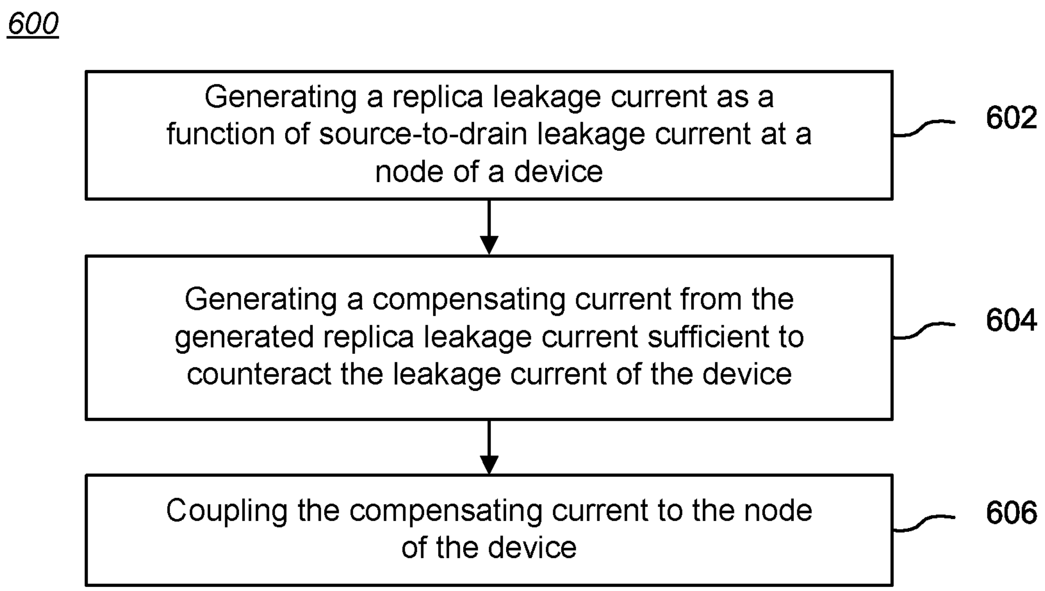
FIG. 6 is a process flow chart showing one method for compensating for source-to-drain leakage current in a circuit.

Another aspect of the invention includes methods for compensating for source-to-drain leakage current. For example, FIG. 6 is a process flow chart 600 showing one method for compensating for source-to-drain leakage current in a circuit device. The method includes: generating a replica leakage current as a function of source-to-drain leakage current at a node of the device [Block 602]; generating a compensating current from the generated replica leakage current sufficient to counteract the leakage current of the device [Block 604]; and coupling the compensating current to the node of the device [Block 606].

Figure 7:
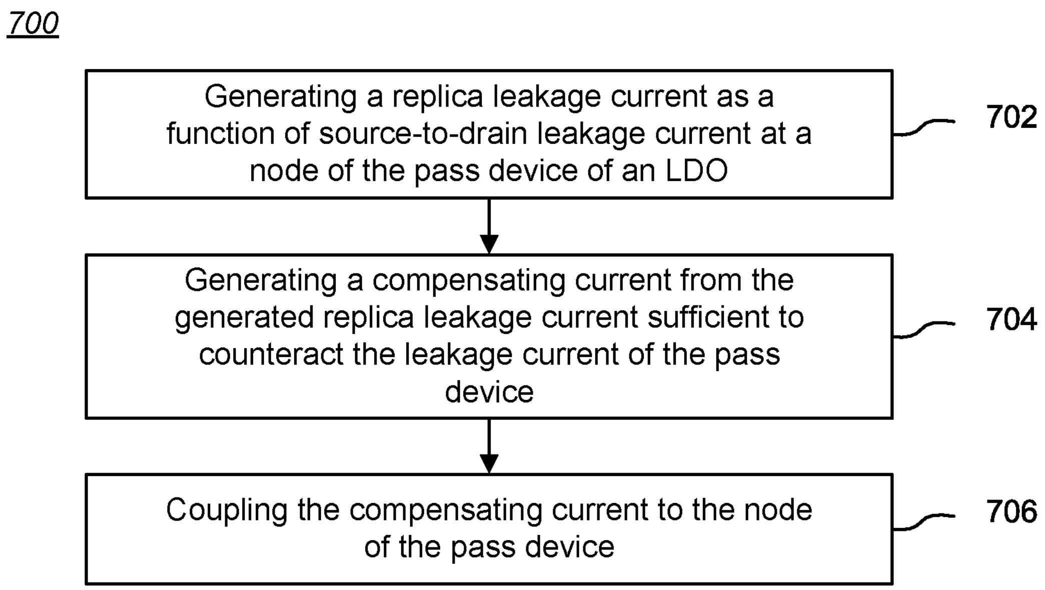
FIG. 7 is a process flow chart showing one method for compensating for source-to-drain leakage current in an LDO.

Another aspect of the invention includes methods for compensating for source-to-drain leakage current in a low-dropout regulator (LDO) having a pass device. For example, FIG. 7 is a process flow chart 700 showing one method for compensating for source-to-drain leakage current in an LDO. The method includes: generating a replica leakage current as a function of source-to-drain leakage current at a node of the pass device of an LDO [Block 702]; generating a compensating current from the generated replica leakage current sufficient to counteract the leakage current of the pass device [Block 704]; and coupling the compensating current to the node of the pass device [Block 706].

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A leakage compensation circuit including:

(a) a replica device including a first terminal configured to be coupled to a voltage supply, a second terminal, and a control input configured to be coupled to the voltage supply, the replica device configured to be coupled in parallel with a circuit device and configured to substantially replicate the electrical characteristics of the circuit device; and (b) a current mirror circuit, coupled to the second terminal of the replica device and configured to be coupled to a node of the circuit device, the current mirror circuit configured to receive an input leakage current from the replica device representative of a leakage current of the circuit device and to generate a reversed-direction compensating current at the node of the circuit device sufficient to counteract the leakage current of the circuit device.

2. The leakage compensation circuit of claim 1, wherein the replica device is scaled to have an N:1 size ratio with respect to the circuit device, and the current mirror circuit has a ratio of input leakage current to compensating current of 1:M, where N and M are positive integers.

3. The leakage compensation circuit of claim 1, wherein the circuit device and the replica device are P-type MOSFETs.

4. The leakage compensation circuit of claim 3, wherein the replica device is in a normally OFF configuration.

5. The leakage compensation circuit of claim 1, wherein the current mirror circuit includes an input FET coupled to the second terminal of the replica device, and an output FET configured to be coupled to the node of the circuit device, wherein the gates of the input FET and the output FET are connected.

6. The leakage compensation circuit of claim 5, wherein the input FET and the output FET are N-type MOSFETs.

7. The leakage compensation circuit of claim 1, wherein the compensating current is set to be equal to or greater than the leakage current of the circuit device minus a load current of the circuit device.

8. The leakage compensation circuit of claim 1, further including a voltage matching circuit coupled between the replica device and the current mirror circuit.

9. The leakage compensation circuit of claim 1, further including a voltage matching circuit coupled to the current mirror circuit and configured to be coupled to the node of the circuit device.

10. The leakage compensation circuit of claim 1, further including a first voltage matching circuit coupled between the replica device and the current mirror circuit, and a second voltage matching circuit coupled to the current mirror circuit and configured to be coupled to the node of the circuit device.

11. A circuit including:

(a) a low-dropout regulator (LDO) having a pass transistor;

(b) a replica device including a first terminal configured to be coupled to a voltage supply, a second terminal, and a control input configured to be coupled to the voltage supply, the replica device coupled in parallel with the pass transistor and configured to substantially replicate electrical characteristics of the pass transistor of the LDO; and (c) a current mirror circuit, coupled to the second terminal of the replica device and to a node of the pass transistor of the LDO, the current mirror circuit configured to receive an input leakage current from the replica device representative of a leakage current of the pass transistor and to generate a reversed-direction compensating current at the node of the pass transistor sufficient to counteract the leakage current of the pass transistor.

12. The circuit of claim 11, wherein the replica device is scaled to have an N:1 size ratio with respect to the pass transistor, and the current mirror circuit has a ratio of input leakage current to compensating current of 1:M, where N and M are positive integers.

13. The circuit of claim 11, wherein the pass transistor and the replica device are P-type MOSFETs.

14. The circuit of claim 13, wherein the replica device is in a normally OFF configuration.

15. The circuit of claim 11, wherein the current mirror circuit includes an input FET coupled to the second terminal of the replica device and an output FET coupled to the node of the pass transistor of the LDO, wherein the gates of the input FET and the output FET are connected.

16. The circuit of claim 15, wherein the input FET and the output FET are N-type MOSFETs.

17. The circuit of claim 11, wherein the compensating current is set to be equal to or greater than the leakage current of the pass transistor minus a load current of the LDO.

18. The circuit of claim 11, further including a voltage matching circuit coupled between the replica device and the current mirror circuit.

19. The circuit of claim 11, further including a voltage matching circuit coupled between the current mirror circuit and the node of the pass transistor.

20. The circuit of claim 11, further including a first voltage matching circuit coupled between the replica device and the current mirror circuit, and a second voltage matching circuit coupled between the current mirror circuit and the node of the pass transistor.

* * * * *